(12) United States Patent
Steinborn et al.

(10) Patent No.: US 8,515,630 B2
(45) Date of Patent: Aug. 20, 2013

(54) METHOD FOR DETERMINING THE OUTPUT ROTATIONAL SPEED OF A MANUAL TRANSMISSION

(75) Inventors: Mario Steinborn, Friedrichshafen (DE); Rainer Petzold, Friedrichshafen (DE); Stefan Veittinger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1011 days.

(21) Appl. No.: 12/529,284

(22) PCT Filed: Mar. 3, 2008

(86) PCT No.: PCT/DE2008/052544
§ 371 (c)(1),
(2), (4) Date: Aug. 31, 2009

(87) PCT Pub. No.: WO2008/110470
PCT Pub. Date: Sep. 18, 2008

(65) Prior Publication Data
US 2011/0246032 A1    Oct. 6, 2011

(30) Foreign Application Priority Data
Mar. 13, 2007    (DE) .......................... 10 2007 011 896

(51) Int. Cl.
*G06F 7/00* (2006.01)
(52) U.S. Cl.
USPC .................................. 701/51; 701/55; 701/56
(58) Field of Classification Search
USPC .............................................. 701/51, 55–56
See application file for complete search history.

(56) References Cited

U.S. PATENT DOCUMENTS

| | | | |
|---|---|---|---|
| 4,849,899 A | 7/1989 | Cote et al. | |
| 4,896,569 A | 1/1990 | Ito et al. | |
| 5,855,532 A | 1/1999 | Sugiyama | |
| 6,205,386 B1 | 3/2001 | Stroh et al. | |
| 6,456,919 B1 | 9/2002 | Korner et al. | |
| 6,793,027 B1 * | 9/2004 | Yamada et al. | 180/65.1 |
| 6,823,954 B2 * | 11/2004 | Shimabukuro et al. | 180/65.25 |
| 7,120,531 B1 | 10/2006 | Melby et al. | |
| 7,223,200 B2 * | 5/2007 | Kojima et al. | 477/3 |
| 7,282,008 B2 * | 10/2007 | Oshidari | 477/4 |
| 2008/0119975 A1 * | 5/2008 | Yamazaki et al. | 701/22 |
| 2009/0248265 A1 * | 10/2009 | Tabata et al. | 701/59 |

FOREIGN PATENT DOCUMENTS

| | | |
|---|---|---|
| DE | 3788138 | 6/1994 |
| DE | 197 267 43 | 1/1999 |
| DE | 198 45 689 | 4/2000 |
| DE | 198 54 254 | 5/2000 |
| DE | 201 05 316 | 5/2002 |
| DE | 10 2004 039 273 | 2/2006 |
| EP | 0 241 216 | 10/1987 |
| EP | 0 459 274 A3 | 12/1991 |
| WO | 81/02918 | 10/1981 |
| WO | 98/13620 | 4/1998 |

* cited by examiner

*Primary Examiner* — Hussein A. Elchanti
(74) *Attorney, Agent, or Firm* — Davis & Bujold, PLLC

(57) ABSTRACT

A method for determining the output speed (N_AB) of a manual transmission of a motor vehicle. The output speed (N_AB) is calculated during a period of a shifting operation in which the current gear is disengaged and the new gear has yet to be engaged. The calculated output speed (N_AB) is used for controlling adjustment of the speed of the transmission input shaft (N_EG) to the speed of the transmission output shaft, or the calculated output speed (N_AB), is used for checking the plausibility of a value of the output speed (N_AB) as determined by the sensors.

17 Claims, No Drawings

METHOD FOR DETERMINING THE OUTPUT ROTATIONAL SPEED OF A MANUAL TRANSMISSION

This application is a National Stage completion of PCT/EP2008/052544 filed Mar. 3, 2008, which claims priority from German patent application serial no. 10 2007 011 896.3 filed Mar. 13, 2007.

FIELD OF THE INVENTION

The present invention relates to a method for determining the output speed of a manual transmission of a motor vehicle for controlling the gear ratio changes in the manual transmission.

BACKGROUND OF THE INVENTION

As is known, automated manual transmissions have shift and select actuators, which may be controlled by a control device for carrying out gear ratio changes. In order to be able to control such gear shifting and selection processes as fast as possible and comfortably for the vehicle passengers, the control device requires exact information about the speed of the transmission input shaft and transmission output shaft. This particularly applies to unsynchronized automated transmissions provided with jaw clutches, in which the speed of the transmission input shaft has to be increased to a predetermined target speed by acting on the drive motor of the vehicle for carrying out a downshift, and in which the transmission input shaft has to be decelerated to a predetermined target speed by means of the transmission brake in case of an upshift. The respective target speeds in this case depend on the current vehicle speed and on the new gear ratio shift. These speed adjustments are made over a period in which a clutch between the drive motor of the vehicle and the transmission is disengaged and the current gear, as well as the new gear, has still not been engaged, the transmission being in its neutral position.

The above mentioned speeds are usually detected by means of speed sensors. Speed sensors of this type require a respective installation space in the area of the transmission input shaft and/or of the transmission output shaft in the narrow transmission housing. Besides, the installation in the transmission increases the manufacturing costs. Furthermore, it is desirable that in transmissions with a speed sensor at the transmission output shaft their speed values may be checked with regard to their plausibility in order to eliminate erroneous values from the transmission control.

DETAILED DESCRIPTION OF THE PREFERRED EMBODIMENTS

Against this background, the object underlying the present invention is to present a method, by means of which the speed at the transmission output shaft may be calculated with sufficient accuracy, and used for controlling gear ratio changes in the transmission, dispensing with a speed sensor. Moreover, this method should be suitable for checking the correctness of the measured speed values in a transmission with a sensor for measuring the speed of the transmission output shaft.

The present invention is based on the knowledge that the transmission output speed can be calculated with sufficient accuracy from the transmission input speed, the current gear ratio as well as a correction value, even during a period in a shifting operation in which the current gear is disengaged and the new gear has still not been engaged.

As is known, the speed of the transmission output shaft N_AB may be determined with an engaged gear by the quotient of the speed of the transmission input shaft N_EG and the current gear ratio Ü_G according to the equation N_AB=N_EG/Ü_G. This equation may in principle also be used for determining the transmission output speed when the transmission is in the neutral position during a shifting operation, in which the current gear is disengaged and the new gear has still not been engaged in a torque-transmitting manner. It should, however, be complemented such that during shifting, the factors influencing the transmission output speed are correctively taken into account.

The present invention relates to a method for determining the output speed of a manual transmission of a motor vehicle for controlling the gear ratio changes in the manual transmission. In this method, it is provided that the above mentioned output speed is calculated during a shifting operation in the period in which the current gear is disengaged and the new gear has still not been engaged, and that the calculated output speed is used for controlling the adjustment of the speed of the transmission input shaft (or another transmission shaft that is drive-coupled to it before the transmission output) to the speed of the transmission output shaft, or that the calculated output speed is used for checking the plausibility of a value of the output speed determined by the sensors.

According to the first alternative of the method, the speed of the transmission output shaft that is calculated during shifting is the speed of the transmission output shaft that is actually expected to be available during the shifting period and would in fact be measurable, if a respective speed sensor had not been dispensed with for cost saving reasons. This calculated value of the output speed is then used for controlling the gear shift, for example, to decelerate the speed of the transmission input shaft to the synchronous speed during upshift operations, or to increase this speed during a downshift operation.

According to the second variant of the method, the calculated transmission output speed is used for checking the plausibility of an output speed value measured by the sensor.

According to another characteristic of the present invention, it is provided that before starting a shifting operation, a correction value F is determined, which is used for calculating the output speed during shifting. This correction value F, $F_{Kal}$, indicates whether and to what extent the current driving situation affects the temporal variation of the transmission output speed during the shifting operation. The correction value F, $F_{Kal}$, may in this case take into account the actual transmission output speed and/or its temporal speed course before starting the shifting operation. In this connection, the correction value F, $F_{Kal}$, may be a speed difference or a ratio.

The calculation of the transmission output speed N_AB is preferably carried out in a transmission control device by means of the following process steps:

a) determination of the transmission input speed N_EG directly before shifting.

b) determination of the last used gear ratio Ü_G prior to shifting, c) calculation of the output speed after starting the shifting operation according to the equation N_AB=[N_EG/Ü_G]*F, if the correction value F is a ratio, or according to the equation N_AB=[N_EG/Ü_G]+F, if the correction value F is a speed difference.

As a further development of the method, it is provided that the ratio of the correction value F is "1", if it is possible to deduce from the determined driving situations that the vehicle speed is expected to remain constant during the shifting operation, is ">1", if it is possible to deduce from the determined driving situations that the vehicle speed is expected to increase during the shifting operation, is "<1" if is possible to deduce from the determined driving situations that the vehicle speed is expected to decrease.

According to other further developments of the method according to the present invention, the figure of the correction value F is determined by the dynamic driving resistance of the vehicle. In this way, the figure of the correction value F is for example determined by the current roadway gradient in the direction of travel, the current mass of the vehicle, the current vehicle speed in the direction of travel before shifting and/or the current vehicle acceleration in the direction of travel and/or perpendicular to the direction of travel before shifting.

According to a second concrete embodiment of the method according to the present invention, to calculate the transmission output speed it is provided that the output speed of the manual transmission is determined during a gear shift by means of the following process steps:

measurement of a speed value at least indirectly indicating the vehicle speed that is too inaccurate to be used directly for controlling gear shift procedures, and correction of the speed value at least indirectly indicating the vehicle speed by means of previously determined correction value $F_{Kal}$ for determining the transmission output speed.

As a further development of this second concrete embodiment of the method according to the present invention, it is provided that for determining the correction value $F_{Kal}$, prior to gear shifting, that is, with an engaged gear, the actual transmission input speed is determined; that for determining the actual transmission output speed, the measured transmission input speed is subsequently divided by the last used gear ratio; that the speed value at least indirectly indicating the vehicle speed is then multiplied by a gear ratio value which indicates a gear ratio (gear ratio value=smaller or greater than zero) or no gear ratio (gear ratio value=1) between the transmission output shaft and the rotary component of the vehicle at which the speed value at least indirectly indicating the vehicle speed is measured; and that for constructing the correction value either the actual output speed is set in relation to the gear ratio-corrected speed value at least indirectly indicating the vehicle speed or a differential value between both of these speed values.

In a further embodiment of this variant, it may be provided that the speed value at least indirectly indicating the vehicle speed is the speed of at least one vehicle wheel or a tachometer speed signal, which is selected from a vehicle data bus system (CAN bus).

The method according to the present invention may preferably be used for controlling automated manual transmissions. In this connection, it may be used for checking the measured values of a speed sensor available at the transmission output shaft with regard to their plausibility or correctness, or to fully replace a sensor for capturing the transmission output speed.

In order to further explain the present invention, two exemplary embodiments will hereinafter be described:

An upshift process should be carried out on an unsynchronized, claw shifted automated manual transmission without a speed sensor at the transmission output shaft or another shaft drive-coupled to it. The control process known per se is carried out such that the master clutch is first released between the vehicle drive motor and the transmission and the current gear disengaged. Subsequently, the speed of the transmission input shaft is decelerated by means of a transmission brake, which is controlled by the control device, to a target speed for the ninth and higher gears to the extent that, taking the gear ratio of the ninth gear into account, the transmission input speed is largely synchronous with the transmission output speed. Once this has taken place, a friction-locked connection is established in the transmission between the transmission input shaft and the transmission output shaft by means of the claw clutch of the new gear so that a torque may be transmitted via the transmission. The master clutch is subsequently engaged again.

The control of the transmission brake for decelerating the transmission input shaft to its target speed therefore critically depends on the current transmission output speed N_AB. In order to be able to optimally set this target speed at the transmission input shaft, the present invention provides that the current output speed N_AB is calculated during a shifting operation in a period in which the current gear is disengaged and the new gear has still not been engaged, and that the calculated transmission output speed is used for controlling the adjustment of the speed N_EG of the transmission input shaft (or another transmission shaft that is drive-coupled to it before the transmission) to the speed N_AB of the transmission output shaft.

Thereby, it is possible to control the gear change and/or deceleration of the transmission input shaft to its target gear in a particularly advantageous manner, even without using a speed sensor at the transmission output shaft.

The transmission output speed is calculated such that the transmission input speed N_EG is first measured with a gear engaged by means of a speed sensor at the transmission input shaft and made available to the control device. Subsequently, the last used transmission gear ratio Ü_G is determined by the control device, and a correction value F is determined. This correction value may be determined such that it is entered in the equation for calculating the transmission output speed during shifting as an addition value or as a multiplication value. According to the already described equation $$N\_AB=[N\_EG/Ü\_G]*F \text{ or } N\_AB=[N\_EG/Ü\_G]+F$$

the transmission output speed N_AB during shifting is then calculated, where the correction value F indicates, if and to what extent the current driving situation affects the temporal change of the transmission output speed N_AB during the shifting operation.

The correction value F, represented as a ratio, may in this case be "1" if it is possible to deduce from the determined driving situation data that the vehicle speed remains constant during the shifting operation. In such a case, the correction value F has no influence on the calculated value of the transmission output speed because it is assumed that the driving speed and/or transmission output speed is not expected to change during the short time in which the transmission is in the neutral position during upshifting.

In another driving situation, the correction value represented as a ratio may be assigned a figure "F>1", if it is possible to deduce from the determined driving situation data that the vehicle speed is expected to increase during the shifting operation. Such an increase in the driving speed may take place if the vehicle is on a strongly sloping roadway and is inertially accelerated. Due to the friction-locked drive connection between the transmission output shaft and the vehicle wheels, the consequence of an increase in driving speed is that the speed of the transmission output shaft also increases during the above mentioned shifting operation. The multiplication of the correction value F by a figure ">1" takes this circumstance into account.

The correction value F matching the respective driving situation may be read from a table stored in the control device that contains stored results of test drives. According to another variant, the correction value F is each time topically calculated according to a model.

Correction values with a figure "F<1" may also be taken from this stored table, if it is possible to deduce from determined driving situations that the vehicle speed is expected to decrease during a shifting operation. This is for example the case if the vehicle moves on a roadway with a strongly ascending slope and is inertially decelerated. The concrete correction value "F<1" in this case likewise depends on the above mentioned driving situation and/or concrete gradient of the roadway, and acts as a multiplicand in the above equation N_AB=[N_EG/Ü_G]*F such that the transmission output speed N_AB determined for the moment before starting the upshift is more or less reduced.

As has already been mentioned, many different driving situations may be taken into account by the correction value F; thus, apart from the roadway gradient, for example, the current dynamic driving resistance of the vehicle, the current vehicle mass, the current vehicle speed and/or the current vehicle acceleration in all space axes and/or speed gradient of the transmission input shaft or of the transmission output shaft shortly before starting the upshift may also be considered.

In a second variant of the method, the transmission output speed is likewise calculated during the shifting operation, that is, at a moment in which the previous gear is disengaged and the new gear has still not been engaged.

In this variant of the method, it is, however, provided that for determining the transmission output speed N_AB, a speed value is first measured, which is measured in the vehicle for other purposes, for example for controlling an antiblocking system or a drive-slip control system, and which is intrinsically too imprecise for controlling transmission gear ratio control processes and/or is often insufficiently available per time unit. This speed value is, however, at least indirectly dependent on the vehicle speed and may, for example, indicate the speed of a vehicle wheel.

After the speed value at least indirectly indicating the vehicle speed has, for example been read from a CAN bus system of the vehicle by the control device of the transmission, it is corrected with a previously determined correction value for determining the current output speed N_AB in order to determine the actual transmission output speed. The correction value is in this case only a single stored magnitude, or is read from a table stored in the control device, for example, in dependence on other correction values, and used for calculating the transmission output speed.

According to a concrete embodiment of the method, for determining the correction value before gear shifting, that is, with an engaged gear, the deviation or the quotient between the actual transmission output speed as well as a transmission output speed calculated from the other speed value known to be too imprecise is constructed, and taken into account as the correction value on determination of the transmission output speed during the gear shifting operation.

In this case, according to the present invention, it is provided that for determining the above mentioned correction value prior to a gear shifting operation, that is, with engaged gear, the transmission input speed N_EG is first determined, that for determining the actual transmission output speed N_AB the measured transmission input speed N_EG is subsequently divided by the last used gear ratio Ü_G, that the speed value at least indirectly indicating the vehicle speed is then multiplied by a gear ratio value that indicates a gear ratio (gear ratio value=smaller or greater than zero) or no gear ratio (gear ratio value=1) between the transmission output shaft and the rotary component of the vehicle (e.g. vehicle wheel) at which the speed value at least indirectly indicating the vehicle speed is measured, and that the actual output speed N_AB is then set in relation to the gear ratio-corrected speed value at least indirectly indicating the vehicle speed for constructing the correction value $F_{KAL}$, or the correction value $F_{KAL}$ is constructed as a speed difference between both of these speed values.

Both method alternatives presented in this description, that is, the calculation of the transmission output speed during shifting for a powertrain without speed sensor at the transmission output shaft, as well as the calculation of the transmission output speed during shifting for checking the plausibility of a speed value determined by means of a speed sensor at the transmission output shaft, are preferably stored together in the same transmission control device.

In a vehicle with a powertrain, in which a speed sensor is not available at the transmission output shaft, the transmission output speed is determined mathematically, and, as has been shown in tests, with adequately good quality. In a vehicle with a powertrain, in which a speed sensor is available at the transmission output shaft, the transmission output speed is determined by means of sensors as well as likewise mathematically, this variant opening the possibility of continuously checking the measured values of the transmission output speed. If the measured speed value and the mathematically determined speed value differ from one another by a predetermined magnitude, a technical defect in measuring the speed may be inferred.

The invention claimed is:

1. A method of determining an output speed (N_AB) of a manual transmission of a motor vehicle for controlling a gear ratio shifting operation in the manual transmission, the output speed (N_AB) being calculated during a period of the shifting operation in which a current gear is disengaged and a new gear has not been engaged, and the calculated output speed (N_AB) is utilized for controlling adjustment of either a speed of a transmission input shaft (N_EG) or another transmission shaft that is drivingly coupled to the transmission input shaft (N_EG) before a transmission output, to the speed of the transmission output shaft, the output speed (N_AB) of the manual transmission is determined during the shifting operation by the method comprising the method steps of:
   measuring a speed value that at least indirectly indicates a vehicle speed that is too inaccurate to be used directly for controlling the shifting operation;
   determining a correction value ($F_{Kal}$); and
   correcting the speed value that at least indirectly indicates the vehicle speed by the previously determined correction value ($F_{Kal}$) for determining the transmission output speed (N_AB).

2. The method according to claim 1, further comprising the step of determining the correction value (F, $F_{Kal}$), which is used for determining the transmission output speed (N_AB) during shifting, before starting the shifting operation.

3. The method according to claim 2, further comprising the step of the ascertaining, from the correction value (F), if and to what extent a current driving situation affects a temporal change of the transmission output speed (N_AB) during the shifting operation.

4. The method according to claim 2, further comprising the step of accounting, with the correction value (F), for at least one of an actual output speed (N_AB) and a temporal speed course before starting the shifting operation.

5. The method according to claim 4, further comprising the step of defining the correction value (F, $F_{Kal}$) as either a speed difference or a ratio.

6. The method according to claim 5, further comprising the steps of:
  determining the transmission input speed (N_EG) directly before shifting;
  determining a last engaged gear ratio (Ü_G); and
  one of:
    calculating the transmission output speed (N_AB) with an equation of N_AB=[N_EG/Ü_G]*F, after starting the shifting operation, if the correction value (F) is a ratio, and
    calculating the transmission output speed (N_AB) with an equation of N_AB=[N_EG/Ü_G]+F, after starting the shifting operation, if the correction value (F) is a speed difference.

7. The method according to claim 6, further comprising the step of concluding that the correction value (F) is 1 as a ratio, if it is deduced from the determined driving situation data that the vehicle speed is expected to remain constant during the shifting operation.

8. The method according to claim 6, further comprising the step of concluding that the correction value (F) is >1 as a ratio, if it is deduced from the determined driving situation data that the vehicle speed is expected to increase during the shifting operation.

9. The method according to claim 6, further comprising the step of concluding that the correction value (F) is <1 as a ratio, if it is deduced from the determined driving situations that the vehicle speed is expected to decrease during the shifting operation.

10. The method according to claim 1, further comprising the step of a value of the correction value (F) is determined from the dynamic driving resistance of the vehicle.

11. The method according to claim 10, further comprising the step of determining a value of the correction value (F) from a current drive surface gradient of the vehicle in a direction of travel.

12. The method according to claim 10, further comprising the step of determining a value of the correction value (F) from a current mass of the vehicle.

13. The method according to claim 10, further comprising the step of determining a value of the correction value (F) from an actual vehicle speed in a direction of travel before shifting.

14. The method according to claim 10, further comprising the step of determining a value of the correction value (F) from an actual vehicle acceleration perpendicular to a direction of travel before shifting.

15. The method according to claim 1, further comprising the steps of:
  determining an actual transmission input speed (N_EG) for determining the correction value ($F_{Kal}$) with a gear engaged prior to gear shifting
  subsequently dividing the measured transmission input speed (N_EG) by a last used gear ratio (Ü_G);
  determining the actual transmission output speed (N_AB), by multiplying the speed value at least indirectly indicating the vehicle speed by a gear ratio value, which indicates either a gear ratio (gear ratio value=smaller or greater than zero) or no gear ratio (gear ratio value=1) between the transmission output shaft and a rotary component of the vehicle at which the speed value at least indirectly indicating the vehicle speed is measured; and
  either setting the actual output speed (N_AB) in relation to the gear ratio-corrected speed value at least indirectly indicating the vehicle speed; or
  calculating a differential value between both of these speed values for determining the correction value ($F_{Kal}$).

16. The method according to claim 1, further comprising the step of defining the speed value at least indirectly indicating the vehicle speed as the speed of either at least one vehicle wheel or a tachometer speed signal, which is read from a vehicle data bus system (CAN bus).

17. The method according to claim 1, further comprising the step of using the method to control an automated manual transmission.

* * * * *